(12) United States Patent
Haas et al.

(10) Patent No.: US 6,893,596 B2
(45) Date of Patent: May 17, 2005

(54) METHOD OF FORMING A ONE PIECE HOCKEY STICK

(75) Inventors: Neal Haas, El Cajon, CA (US); Brian Mollner, Chula Vista, CA (US)

(73) Assignee: True Temper Sports, Inc., Memphis, TN (US)

( * ) Notice: Subject to any disclaimer, the term of this patent is extended or adjusted under 35 U.S.C. 154(b) by 0 days.

(21) Appl. No.: 10/389,243

(22) Filed: Mar. 14, 2003

(65) Prior Publication Data

US 2004/0178533 A1 Sep. 16, 2004

(51) Int. Cl.[7] .......................... B29C 70/44; B29C 45/14
(52) U.S. Cl. ..................... 264/257; 264/258; 264/259; 264/271.1; 264/279.1; 264/296; 264/328.1
(58) Field of Search ................................. 264/510–512, 264/571, 101–102, 257–258, 296, 324, 259, 328.1, 271.1, 279.1

(56) References Cited

U.S. PATENT DOCUMENTS

| | | | |
|---|---|---|---|
| 4,504,344 A | | 3/1985 | Helle et al. |
| 5,083,780 A | * | 1/1992 | Walton et al. ............. 273/80 B |
| 5,192,384 A | * | 3/1993 | Barrier et al. ............... 156/189 |
| 5,215,322 A | * | 6/1993 | Enders ......................... 280/231 |
| 5,413,338 A | * | 5/1995 | Kawamatsu ............... 273/80 B |
| 5,593,633 A | * | 1/1997 | Dull et al. ................... 264/510 |
| 5,746,955 A | * | 5/1998 | Calapp et al. ............... 264/103 |
| 5,762,352 A | | 6/1998 | Lee |
| 5,810,676 A | * | 9/1998 | Bird ............................ 473/319 |
| 5,882,268 A | | 3/1999 | McIntosh et al. |
| 5,951,410 A | | 9/1999 | Butler et al. |
| 5,984,804 A | | 11/1999 | Berg |
| 5,989,133 A | | 11/1999 | Lee et al. |
| 5,993,328 A | | 11/1999 | Pedersen et al. |
| 6,134,937 A | | 10/2000 | Lee et al. |
| 6,203,447 B1 | | 3/2001 | Dillard |
| 6,241,633 B1 | * | 6/2001 | Conroy ........................ 473/561 |
| 6,261,500 B1 | * | 7/2001 | Park et al. ................... 264/258 |
| 6,391,246 B2 | * | 5/2002 | Shiraishi et al. ............ 264/510 |
| 6,533,985 B1 | * | 3/2003 | Smith .......................... 264/257 |

OTHER PUBLICATIONS

Haas, N. *True Temper Graphite Plant Tour* [online], Jun. 2002 [retrieved on Mar. 18, 2003]. Retrieved from the Internet: <URL: http://www.truetemper.com/Technical/Tour_graphite_$_o$.htm>.

* cited by examiner

*Primary Examiner*—Stefan Staicovici
(74) *Attorney, Agent, or Firm*—Harness, Dickey & Pierce, P.L.C.

(57) ABSTRACT

A method of manufacturing a one piece, composite, hockey stick in an autoclave. A mandrel is provided which has a non uniform cross section. Pre-preg flags are wrapped around the mandrel. Provision is made so that when the wrapped mandrel is inserted in a pressure application tube, a portion of the wrapped mandrel is separated from the pressure application tube by one or more spacers. Pressure is then applied to the pressure application tube which in turn applies the pressure to the spacers. The spacers then apply the pressure to the wrapped mandrel to compact the pre-preg on the wrapped mandrel. Next the spacers are removed and the pre-preg is cured. Finally, a blade is formed around the pre-preg flag.

12 Claims, 3 Drawing Sheets

METHOD OF FORMING A ONE PIECE HOCKEY STICK

FIELD OF THE INVENTION

The present invention relates to a method of forming a one piece hockey stick, and more particularly to forming the shaft for a one piece, composite, hockey stick with superior playing characteristics.

BACKGROUND OF THE INVENTION

Slap shots can propel hockey pucks at over 100 mph. During the downswing of a slap shot, the shaft of the golf club flexes thereby storing mechanical energy via the strain of the shaft. When the stick impacts the puck, the strain energy relieves and transfers to the puck via the blade of the stick. Simultaneously, the player is following through by forcefully pushing, with the weight of his body, the stick against the puck. Thus, the combination of force from the follow through, momentum exchange from the impact, and sudden energy release from the shaft propels the puck at much greater velocity than a mere momentum exchange with the blade would, frequently in excess of 100 mph.

Many prior art hockey sticks employ a blade with a male tongue, or tenon, at the shaft end of the blade. The tenon slides into a mating opening in the shaft. The blade is then bonded to the shaft. Then the resulting joint is sanded and painted over to give the assembly a one piece appearance. Unfortunately, the added weight of the joint; the mechanical play inherent in the joint, and the inherent yield of the bonding material adversely affect the play of the stick. Merely sanding and painting the joint cannot mitigate these adverse effects.

Other hockey sticks employ a wooden, tapered portion of the shaft with a blade molded around the tapered portion via resin transfer molding to create a mechanical joint. Regardless of the type of mechanical joint employed, any mechanical joint adversely affects the flex and mechanical integrity of the prior art hockey sticks. For instance, since the mechanical joint must be rigid to secure the blade to the shaft, the designer must add reinforcing material, and hence weight to the blade end of the stick. In the alternative, the designer can accept the weak joint as is. Because the added weight of the reinforced joint lies near the end of the stick, the stick suffers from a disproportionately large increase in moment of inertia, thereby slowing the player's downswing considerably.

Worse yet, the designer, in seeking to optimize shaft flexure, must contend with an inflexible portion of the shaft, the joint, which impedes the optimization of the stick. Thus the energy transfer of a stick with a mechanical joint is considerably less than it ought to be.

Additionally, mechanical joints allow mechanical play and yielding between the blade and shaft. An example of which is the force of impact tending to cause the blade to rotate relative to the shaft. Poor mechanical joints at the blade/shaft transition allow greater blade rotation. Likewise, poor mechanical joints allow translational movement between the blade and the shaft. The movement can occur in both lateral (e.g. parallel to the ice) and vertically (e.g. along the axis of the shaft). While such relative motion may be small, the distance the hockey puck travels amplifies the poor aim caused by such relative movement. Moreover bonding does little to eliminate these problems because the adhesive employed can yield. These shortcomings make repeatable shots difficult with a given stick. They also make performance differences between sticks unpredictable.

Accordingly, it would be desirable to eliminate the mechanical joint between the blade and shaft of a hockey stick. It would also be desirable to provide a method to manufacture a one piece hockey stick with more predictable and superior mechanical properties, particularly at the shaft to blade transition where better torsional and translational control is desirable. It would further be desirable to provide fewer performance differences between different hockey sticks.

SUMMARY OF THE INVENTION

In a first embodiment of the present invention a method is provided to manufacture a shaft for a one piece, composite, hockey stick. In accordance with the first embodiment, the shaft of the stick is provided with a tapered blade end. During manufacture of the stick, a mandrel is used to define the shape of the shaft. Numerous pre-preg flags are wrapped around the mandrel and then compacted in such a way that the compaction of the tapered blade end is controlled. The pre-pregs are then cured and a blade is then formed around the tapered blade end and partially infused therein.

A second embodiment of the present invention provides another method to manufacture a shaft for a one piece, composite, hockey stick. In accordance with the second embodiment, the shaft of the stick is provided with a tapered blade end. During manufacture of the stick, a mandrel is used to define the shape of the shaft. Numerous pre-preg flags are wrapped around the mandrel and then compacted in such a way that the amount of compaction of the tapered blade end is independent of the amount of compaction of the rest of the shaft. The pre-pregs are then cured and a blade is then formed around the tapered blade end and partially infused therein.

A third embodiment of the present invention provides a one piece, composite, hockey stick. The stick has a shaft with a compacted tapered blade end including a surface which is free from macroscopic irregularities from the compaction. The stick also has a blade partially infused into the tapered blade end.

A fourth embodiment of the present invention provides another one piece, composite, hockey stick. The shaft has a compacted tapered blade end and a compacted non tapered section. The amount of compaction of the tapered blade end and the amount of compaction of the non tapered section, though are different. Additionally, the stick has a blade partially infused into the tapered blade end.

A fifth embodiment of the invention provides another one piece, composite, hockey stick. The shaft has a compacted tapered blade end and a compacted non tapered section. The amount of compaction of the tapered blade end and the amount of compaction of the non tapered section, though are different. Moreover, the amount of compaction of the tapered blade end is controlled. Additionally, the stick has a blade partially infused into the tapered blade end.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
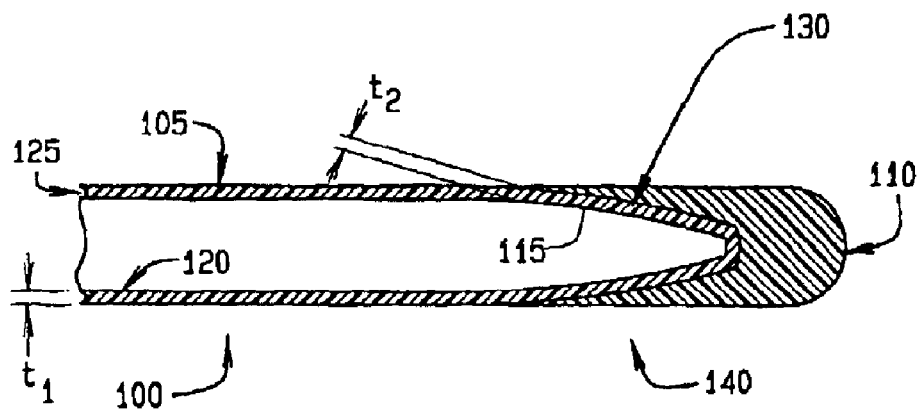
FIG. 1 is a cross sectional view of a hockey stick in accordance with one embodiment of the present invention.
Figure 2:
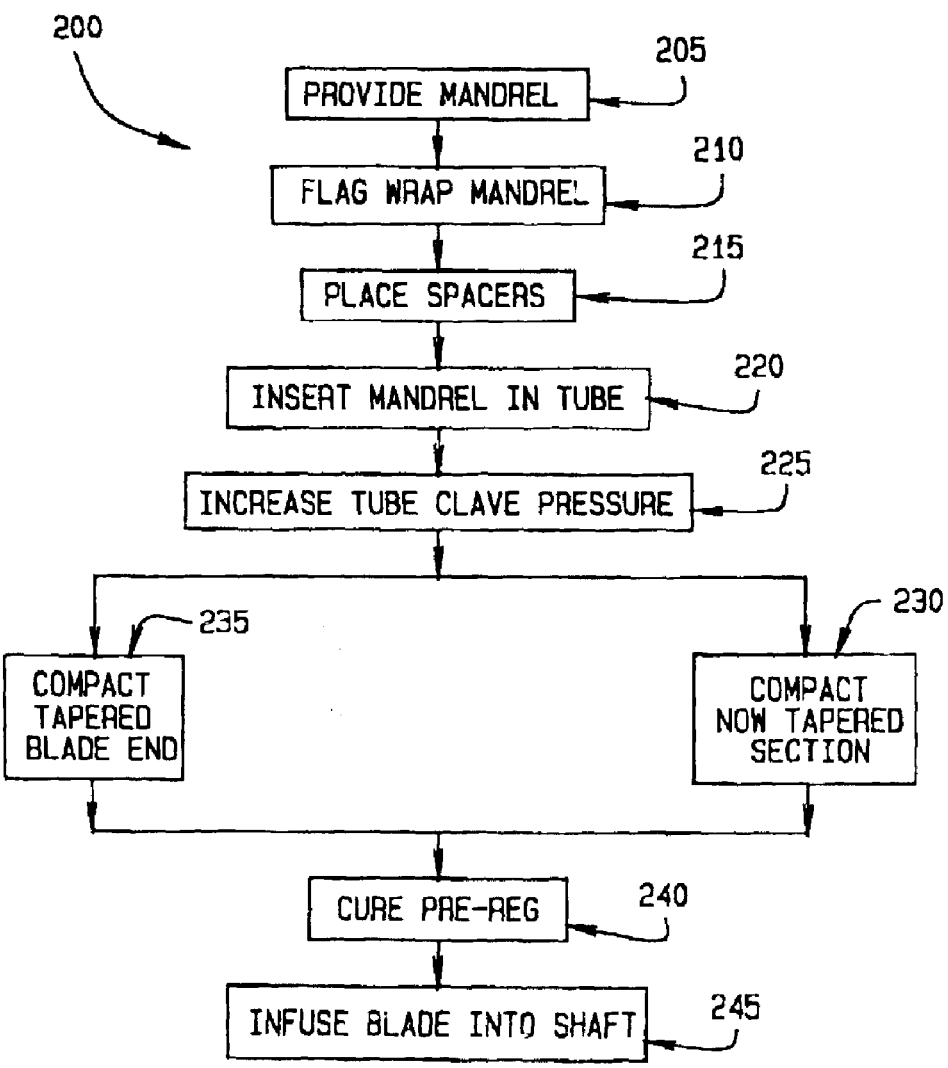
FIG. 2 is a flow chart of a manufacturing method according to the present invention.

With reference to FIG. 1 a hockey stick 100 per the present invention is shown. The stick has a shaft 105 and a blade 110 (shown extending vertically from the page). The shaft 105 has a tapered blade end 115 where the shaft 105 to blade 110 transition 140 occurs. The shaft also has a non tapered section 120 generally extending to a grip end (not shown) for handling the stick 100. A carbon and Kevlar composite may be used, for example, to form a thin wall 125 of the shaft 105.

More particularly, the thin wall 125 has a tapered blade end and a non tapered section coincident with those of the shaft 105. Both the non tapered section 120 and the tapered blade end 115 have been compacted during manufacture. The amount by which the non tapered section 120 and the tapered blade end 115 are compacted may differ. Accordingly, the non tapered section 120 has a thickness t1 while tapered blade end 115 has a thickness t2. Likewise the thickness t1 and the thickness t2 need not be the same, though they may be.

The shaft 105 and blade 110 are integral, or unitary, parts of the hockey stick 100. As will be seen shortly, the blade 110 is partially infused into the thin wall along the exterior (prior to blade 110 formation) surface 130 of the tapered blade end 115. Due to the compaction, the thin wall 125 is free of macroscopic voids. Though, the thin wall 125, being a composite made of fibers, still retains porosity. Of course, the pores at the tapered blade end 115 are at least partially filled by the infusion of a resin, which forms the blade 110, into the tapered blade end 115.

Accordingly, the blade 110 is at least partially infused into the tapered blade end 115. The infusion of the blade 110 into the shaft 105 provides a number of significant advantages. First, the hockey stick 100 is an integral, or unitary, one piece device. No mechanical play exists between the shaft 105 and the blade 110. Thus the blade 110 may neither rotate nor translate relative to the shaft 105. Accordingly, a marked improvement in predictability and reliability of the play of the hockey stick 100 results from the one piece construction.

Moreover, with no bonding agent required, no yield occurs between the blade 110 and the shaft 105. Thus the blade/shaft transition 140 is as strong as the composite material allows. Note that the term transition here, generally refers to the structure(s) of the hockey stick via which forces, torques, and mechanical energy are transferred between the shaft 105 and the blade 110. More particularly, transition 140 may refer in the alternate to 1.) the tapered blade end 115, 2.) the blade 110 infused volume of the tapered blade end 115, 3.) the general volume of the hockey stick 100 around the tapered blade end 115, 4.) the exterior surface 130, 5.) combinations thereof, or 6.) other structure(s) generally near the tapered blade end 115.

Accordingly, the hockey stick 100 per the present invention requires no reinforcing structure to accommodate the mechanical joint that would otherwise be present at the transition 140. Though, reinforcement may be added if desired to stiffen the hockey stick 100 further still. Yet other advantages result accordingly. First, the hockey stick 100 is lighter. Second, the moment of inertia of the hockey stick 100 is greatly reduced. Thus the present invention provides a more "playable," more easily handled hockey stick 100.

Additionally, the exterior surface 130 of the tapered blade end 115 merits further description. In a preferred embodiment, the surface 130 is generally as smooth as the porous nature of the composite, e.g., carbon and Kevlar, allows. Substantially no macroscopic irregularities (e.g. peaks, ridges, valleys, or pits) are introduced during the manufacture of the hockey stick 100. Here again, substantially no macroscopic irregularities means that the only irregularities which do exist do not affect the strength of the part and generally conform to the norms of compaction as practiced by those skilled in the art. Thus, the only other irregularities are those microscopic irregularities attributable to the porous composite. Here, microscopic refers to features of a size roughly smaller than a few multiples of the fibers or pores of the composite. Whereas, macroscopic, refers to features of a size larger than microscopic (i.e. a significant fraction or multiple of the outer radius of the shaft 105).

In the substantial absence of such macroscopic irregularities, the full strength of the transition 140 may be realized repeatedly and predictably in each hockey stick 100 manufactured per the present invention. Otherwise, the macroscopic irregularities present in the prior art hockey sticks weaken the transition 140. Thus, the present invention provides a hockey stick 100 with superior and more predictable and repeatable playing characteristics over the prior art.

Turning now to FIGS. 2 and 3a to 3e, the present invention provides a method 200 of manufacturing the one piece hockey stick 100 described above. Initially, a mandrel 305 (FIG. 3a) is created or provided to define the shape of the shaft 105 of the hockey stick 100 (step 205). Generally, the shaft 105 will have a rectangular cross section along its height. The depth of the mandrel 305 is such as to yield a shaft 105 of approximately 1.125" deep. About 12" from the terminus of the tapered blade end 315 of the mandrel 305, the mandrel 305 tapers to yield a shaft 105 which tapers from a width of approximately 0.75" to a narrower width of approximately 0.1875" (the depth of the mandrel 305 and shaft 105 being held constant). Thus, the mandrel 305 also defines the shape of the tapered blade end 115 of the shaft 105 where the blade 110 will be formed.

Continuing now to form the shaft, a composite material, known as pre-preg (composite fibers that have been pre-impregnated with resins), is received on rolls approximately 36–39" in length and 12" in diameter. Available composite materials have various modulus (strength) ratings suitable to meet the requirements of each individual shaft design. Carbon and Kevlar are one preferred combination of pre-preg materials for use in the present invention. The pre-preg material is sent through a cutting machine where it is cut into sheets.

The composite sheets are then cut into "flags" 356. The shapes and materials of each flag 356 are chosen to provide strength and torsional stability to the finished shaft 105 according to principles known to those skilled in the art.

Typically, 8 to 12 flags are employed per hockey stick. However, some applications use as few as 1 or as many as about 30 flags. The flags 356 are wrapped around the mandrel 305 in various orientations according to the specific requirements of each shaft (step 210). The step 210 of the method 200 is known as "flag wrapping." During flag wrapping the operator orientates each flag 356 in the proper position along the mandrel 305. Then, a flag wrapping machine wraps the flag 356 tightly about the mandrel 305. (See FIG. 3a).

Figure 3A:
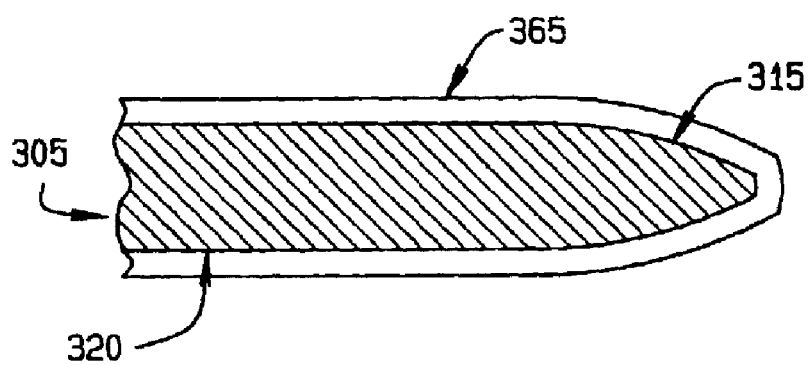
FIGS. 3a to 3e are cross sectional views of the hockey stick of FIG. 1, as it is being manufactured, according to the present invention.
Figure 3B:
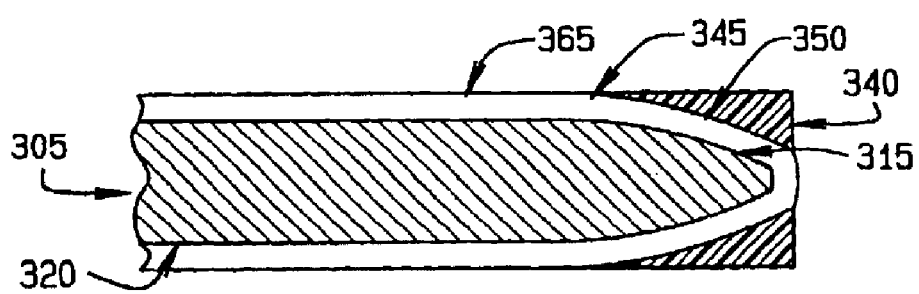

Once all of the flags 356 have been wrapped around the mandrel 305, spacers, or overpresses, 340 of, for example TEFLON, are placed next to the tapered blade end 315 of the wrapped mandrel 305 (step 215 and FIG. 3b). The blade end overpresses 340 are generally triangular in shape, match the taper angle of the wrapped mandrel 305 (i.e. the taper angle of the tapered blade end 115) and create a flush or co-planar surface 345 with the non tapered section 320 of the wrapped mandrel 305. The combination of the blade end overpresses 340 and the mandrel provide an assembly having a substantially constant perimeter. Also, the blade end overpresses 340 desirably possess a smooth surface 350 which abuts the tapered blade end 315 of the wrapped mandrel 305. The smooth surface 350 preferably has a surface roughness of 63 to 500 micro inch and is substantially free of waviness and other macroscopic surface flaws.

Figure 3C:
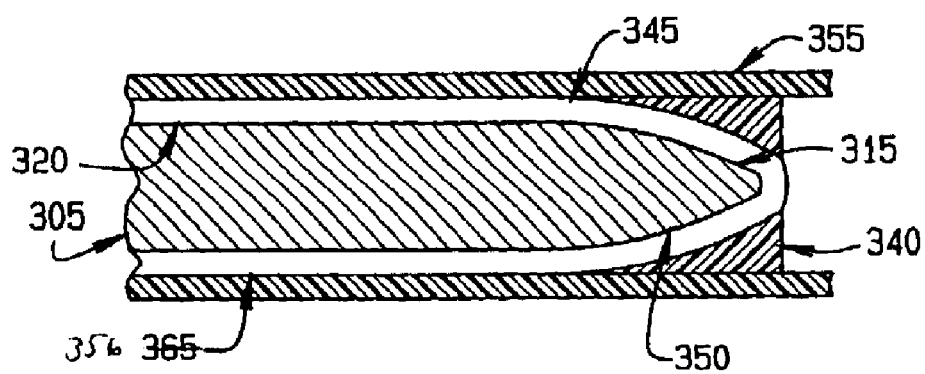
Figure 3D:
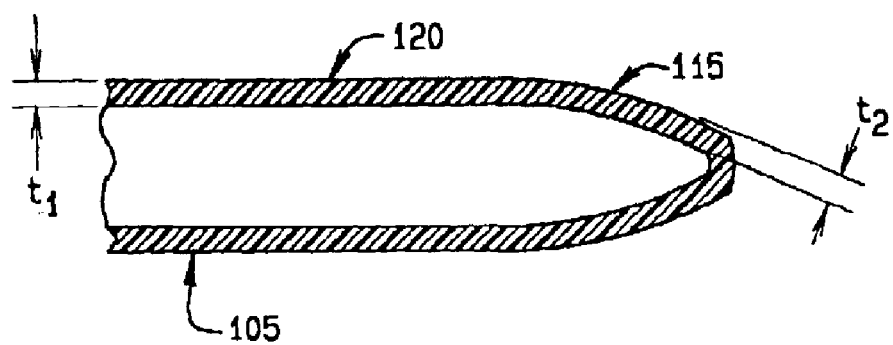
Figure 3E:
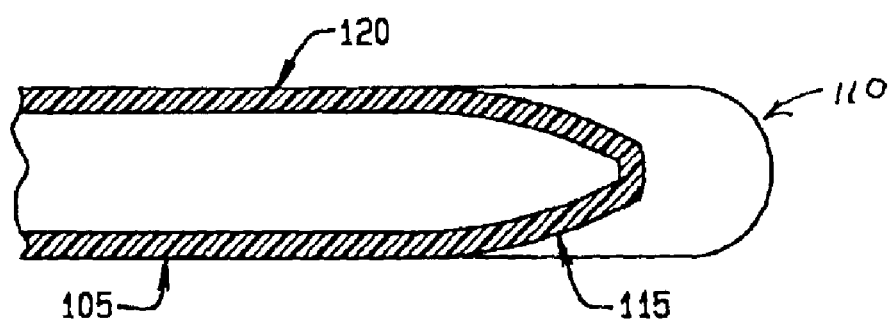

A close fitting pressure application tube 355 made from, for example, silicone is then slid over the wrapped mandrel 305 with the blade end overpresses 340 held in place (step 220 and FIG. 3c). The pressure application tube 355 is sized so that when in place, it holds the blade end overpresses 340 firmly against the wrapped mandrel 305 without causing significant compaction of the pre-preg flags 356 when at atmospheric pressure. The ends of the pressure application tube 355 are then pressure sealed.

The wrapped mandrel 305, blade end overpresses 340, and pressure application tube 355 are then placed in a pressure chamber (not shown) which is generally sized to hold the assembled wrapped mandrel 305, blade end overpresses 340, and pressure application tube 355. The resulting assembly (including the pressure application tube 355) is known as a tubeclave. The pressure is then increased in the tubeclave (step 225). As the pressure increases, the pressure application tube 355 begins to compress. Where the pressure application tube 355 contacts the wrapped pre-preg flags 356 directly (along the non tapered section 320) the pressure application tube 355 itself compacts the flags 356 against the mandrel 305 as a result of the pressure difference between the interior of the pressure application tube 355 and the tubeclave pressure (step 230).

Where the blade end overpresses 340 separate the pressure application tube 355 from the wrapped mandrel 305, the pressure application tube 355 presses against the blade end overpresses 340. In turn, the blade end overpresses 340 press against the flags 356 and compacts the flags 356 against the mandrel 305 (step 235).

At this point in the process, it is useful to note several novel and advantageous aspects of the present invention. In the absence of the blade end overpresses 340 (per the present invention) the pressure application tube 355 near the tapered blade end 315 of the wrapped mandrel 305 will begin collapsing toward the tapered blade end 315. More than a mere compression of the pressure application tube 315 would be occurring at this point. Rather, as the pressure application tube 355 compresses, the pressure application tube 355 would have to buckle to accommodate its continued compression.

The reason for the buckling is that near the tapered blade end 315 of the mandrel 305, the pressure application tube 355 has a larger circumference than the tapered blade end 315 of the mandrel 305. Accordingly, overlaps, then folds, then ultimately creases form in the pressure application tube 355 near the tapered blade end 315. These deformations of the pressure application tube 355 would cause the pressure application tube 355 to press against the tapered pre-preg material in a non uniform way, meaning that in some areas voids would occur between the pressure application tube 355 and creases in the pressure application tube 355 would press against the tapered pre-preg material in other areas. The result of the overlaps, folds, and creases in the pressure application tube 355 and the voids between the pressure application tube 355 and the tapered pre-preg, would be a tapered pre-preg having substantial macroscopic irregularities. Here substantial macroscopic irregularities means macroscopic irregularities which do indeed affect the strength of the part and which deviate from the norms of compaction as practiced by those skilled in the art.

In contrast, with the blade end overpresses 340 held in place by the pressure application tube 355 (according to an embodiment of the present invention), the pressure application tube 355 compresses in a controlled, predictable manner: without overlaps, folds, or creases. By transferring the pressure to the flags 356 via the blade end overpresses 340, the method of the present invention provides for uniform compaction of the flags 356 wrapped around the tapered blade end 315. For the same reason, the present invention provides for much closer control of the geometry and surface features of the tapered blade end 115 of the shaft 105 which is ultimately formed from the pre-preg flags 356. Thus, the exterior surface 130 (FIG. 1) of the tapered blade end is substantially free (as previously defined) of macroscopic irregularities that otherwise would be introduced during the compaction. The only other irregularities present on the exterior surface 130 are due to the porosity and fibers of the pre-preg flags 356.

In practice, it has been noted that autoclave assemblies assembled in a commercially economical manner do allow the creation of one ridge near the transition between the non tapered and tapered sections and on the tapered section. However, the ridge is small enough, and located where the blade resin is thin enough, that any effect on the strength of the transition is de minimis (i.e. trifling). Thus, this small ridge does not qualify as a substantial macroscopic irregularity as defined herein.

Figure 4:
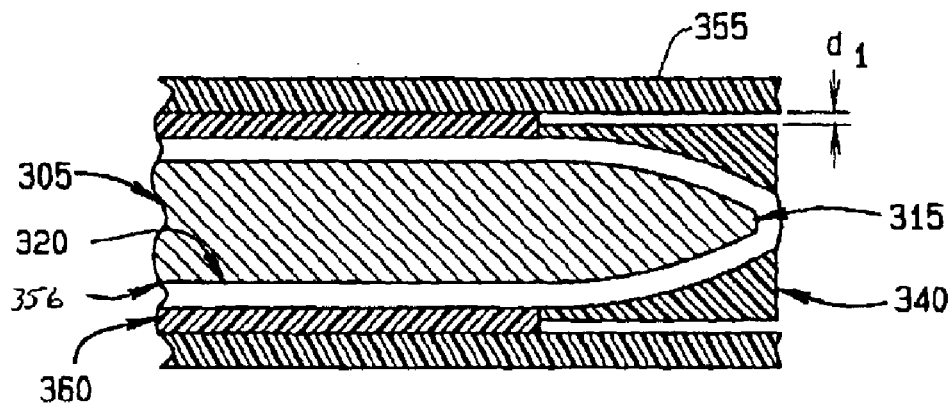
FIG. 4 is a cross sectional view of a hockey stick according to another embodiment as it is being manufactured.

Returning now to the method according to the present invention, the present invention allows the amount of compaction of the flags 356 around the tapered blade end 315 (step 235) and the amount of compaction of the flags 356 around the non tapered section 320 (step 230) to be independent of each other. For instance, the blade end overpresses 340 may be deliberately undersized. See FIG. 4. Here, the blade end overpresses 340 again abut the tapered blade end 315 of the wrapped mandrel 305. Also, shaft spacers 360 abut the non tapered section 320 of the wrapped mandrel 305. See FIG. 4. However, the shaft spacers 360 in this embodiment are slightly larger than the blade end overpresses 340 (in an alternative embodiment the shaft spacers 360 may be slightly larger, by a distance d1, than the blade end overpresses 340.). Thus, when the pressure application tube 355 begins to compress, the pressure application tube 355 first exerts a force against the shaft spacers 360. The shaft spacers 360, thus begin compacting the flags 356 around the non tapered section 320 first (step 230).

As the compression of the pressure application tube 355 continues, the pressure application tube 355 begins exerting a force against the blade end overpresses 340 (step 235). The blade end overpresses 340 then compact the flags 356 around the tapered blade end 315. Thus, the amount of compaction at the tapered blade end 315 and the amount of compaction at the non tapered section 320 of the wrapped mandrel 305 are independent of each other. Accordingly, the compacted flags 356 around the tapered blade end 315 may have a thickness t2 while the flags 356 around the non tapered section 320 may have a different thickness t1 (See FIG. 3d).

Since the distance d1 may be small relative to the thickness of the pressure application tube 355, the pressure application tube 355 will tolerate the small change. Also, the overpresses 340 and 360 will even out the effect of any small overlaps, folds, or creases which might develop in the pressure application tube in the area near the place where the overpresses 340 and 360 meet. Thus, control of the compaction of both the tapered blade end 315 and the non tapered section 320 will be controlled. By so de-linking the compaction of the flags 356 at the tapered blade end 315 and the flags 356 at the non tapered section 320, the present invention provides a new design option for the hockey stick practitioner: independent compaction of the tapered blade end 315 and the non tapered section 320.

Thus, while the prior art compaction of the pre-preg flags may have haphazardly tolerated small taper angles without the blade end spacers 315, the blade end spacers 315 allow for predictable compaction of devices, even those with much larger taper angles. Carried to the logical conclusion, the present invention provides a way to create abrupt changes in the cross section of the shaft 105 by use of spacers while still maintaining controlled compaction of the pre-preg flags 356.

Returning again to the method of the present invention (FIG. 2), the entire tubeclave is next placed in a curing oven. The temperature of the oven is raised to, and held at, for example, 300 degrees F. for approximately two hours. During the curing process (step 240), the still compressed pressure application tube 355 ensures that substantially no macroscopic voids develop in the compacted pre-preg flags 356 material. After curing, the pressure application tube 355 containing the now cured hockey stick shaft 105 (with the mandrel 305 temporarily remaining inside of it) and the blade end spacers 315 are removed from the tubeclave. The pressure application tube 355 and blade end spacers 315 are removed from the cured shaft 105. Next a hydraulic mandrel puller removes the mandrel 305 from the cured shaft 105.

The shaft 105 is now ready to be cut to its final length by trimming it at the butt-end (the end opposite the blade end). Trimming may also occur at the blade end. At this point, the non tapered section 120 of the shaft 105 may be smoothed to meet the esthetic preferences of the players. For this purpose, the non tapered section 120 is placed in a grinder where two opposing grinding wheels smooth the non tapered section 120 to an even consistency.

Next, the cured shaft 105 is placed in a mold (not shown) for forming the blade 110 around the tapered blade end 115 of the shaft. Preferably, the shaft 105 is placed in the mold so that the entire tapered blade end 115 extends into the mold with none of the non tapered section 120 extending into the mold. Via resin transfer molding, the blade 110 is formed around the tapered blade end 115 of the shaft 105 (See FIG. 3e). Then, the blade 110 (shown again extending vertically from the page) resin is allowed to cure and the mold is released. The chosen resin should have a cure time (whether catalyzed or not) and viscosity such that the resin infuses the pores between the fibers of the pre-preg material of the tapered bladed end 115 to a predetermined depth chosen according to the desired properties of the finished hockey stick 100 (step 245).

Vacuum assisted resin transfer molding may be employed to speed and deepen the infusion of the resin into the pre-preg material, though vacuum resin transfer molding is not required according to the present invention. Accordingly, by permeating a volume of the compacted pre-preg material near the surface to the predetermined depth, the resin forms a blade 110 integral with the shaft 105. Accordingly, no mechanical play will exist, nor will yielding occur, between the blade 110 and the shaft 105 as with the prior art.

Finally, the shaft 105 is finished by applying esthetic features to the surface. The shaft 105 may be painted by use of squeegee buckets. An even coat of paint is applied as the shaft 105 by pulling through the reservoir of paint. The shaft 105 is then placed in an oven (at a temperature low enough to avoid damaging the cured resin of the blade 110) to allow the paint to cure prior to the shaft graphics being applied.

Shaft cosmetics are applied by two methods: silk-screening heat transfers. The silk-screen method utilizes a screen that allows paint to be applied to a certain area of the shaft 105 depending on the creative design. The heat transfer method is similar to an iron-on decal in that it utilizes artwork on a roll of film that is applied to the shaft 105 with heat and pressure.

The present invention is especially well suited for the manufacture of composite, one piece, hockey sticks, but it will be appreciated that the invention will find utility in a wide variety of other manufacturing applications as well. In particular, the present invention provides a lighter, better balanced, more reliable, and more predictable hockey stick.

The description of the invention is merely exemplary in nature and, thus, variations obvious to those skilled in the art are intended to be within the scope of the invention. Such variations are not to be regarded as a departure from the spirit and scope of the invention.

What is claimed is:

1. A method of manufacturing an elongated composite member having a tapered section, the method comprising:
   providing a mandrel having a tapered section and a non-tapered section;
   wrapping the tapered and non-tapered sections of the mandrel with at least one pre-prep flag;
   placing at least one spacer outboard of the pre-prep flap along the tapered section of the mandrel, the spacer creating a substantially co-planar surface with the non-tapered section of the mandrel;
   compacting the pre-preg flag with a pressure application tube and the spacer;
   curing the pre-preg flag to form the elongated composite member; and
   separating the elongated composite member from the tube, spacer and mandrel.

2. The method of claim 1 wherein:
   an amount of compaction at the non tapered section and an amount of compaction at the tapered section are independent of one another.

3. The method of claim 1 further comprising:
   infusing a blade into the tapered section of the member; and
   curing the blade.

4. A method of manufacturing an elongated member, the method comprising:
   defining a shape of the member with a mandrel having a tapered section and a non tapered section;

wrapping the tapered and non tapered sections of the mandrel with at least one pre-prep flap;

compacting the pre-preg flag wrapped around the non tapered section of the mandrel with a pressure application tube;

compacting the pre-preg flag wrapped around the tapered section of the mandrel with at least one spacer within the pressure application tube, the spacer creating a substantially co-planar surface between the tapered and non tapered sections of the mandrel;

curing the pre-preg flag to form the elongated member; and separating the elongated member from the tube, spacer and mandrel.

5. The method of claim 4 further comprising:

infusing a blade into the tapered section of the member; and curing the blade.

6. The method of claim 1 wherein the tube has a substantially constant inner diameter.

7. The method of claim 1 wherein the non tapered section of the mandrel has a substantially rectangular cross-section and the at least one spacer further comprises two substantially triangular overpresses.

8. The method of claim 1 wherein the elongated composite member further comprises a shaft of a hockey stick.

9. The method of claim 4 wherein the tube has a substantially constant inner diameter.

10. The method of claim 4 wherein the non tapered section of the mandrel has a substantially rectangular cross-section and the at least one spacer further comprises two substantially triangular overpresses.

11. The method of claim 4 wherein the elongated member further comprises a shaft of a hockey stick.

12. A method of manufacturing an elongated composite member having a tapered section, the method comprising:

providing a mandrel having a first section and a second section extending from said first section, the second section having a taper relative to said first section;

wrapping the first and second sections of the mandrel with at least one pre-preg flag;

placing at least one overpress outboard of the pre-preg flag along the second section of the mandrel, the overpress creating a substantially co-planar surface with the first section of the mandrel;

compacting the pre-preg flag with a pressure application tube and the overpress;

curing the pre-preg flag to form the elongated composite member; and separating the elongated composite member from the tube, overpress and mandrel.

* * * * *

UNITED STATES PATENT AND TRADEMARK OFFICE
CERTIFICATE OF CORRECTION

PATENT NO. : 6,893,596 B2
DATED : May 17, 2005
INVENTOR(S) : Neal Haas et al.

It is certified that error appears in the above-identified patent and that said Letters Patent is hereby corrected as shown below:

<u>Column 8,</u>
Line 44, "pre-prep" should be -- pre-preg --.
Line 45, "pre-prep flap" should be -- pre-preg flag --.

<u>Column 9,</u>
Line 2, "flap" should be -- flag --.

Signed and Sealed this

Ninth Day of August, 2005

JON W. DUDAS
*Director of the United States Patent and Trademark Office*